Sept. 26, 1967  H. W. DAVIDSON ET AL  3,343,635
ELECTROSTATIC CLUTCHES

Filed March 12, 1965  3 Sheets-Sheet 1

INVENTORS
HUGH WILSON DAVIDSON
HOWARD HAROLD WALTER LOSTY
BY Kinderton, Kinderton & Oltyes
ATTORNEYS

United States Patent Office 3,343,635
Patented Sept. 26, 1967

3,343,635
ELECTROSTATIC CLUTCHES
Hugh Wilson Davidson, Pinner, and Howard Harold Walter Losty, Watford, England, assignors to The General Electric Company Limited, London, England
Filed Mar. 12, 1965, Ser. No. 439,409
6 Claims. (Cl. 192—21.5)

ABSTRACT OF THE DISCLOSURE

In an electrostatic clutch operated by the Johnsen-Rahbek effect producing attraction between adjacent electrically conducting and semiconductive surfaces, the semiconductive member is composed of semiconductive carbon having a carbon content of more than 80% by weight and electrical resistivity in the range of $10^3$ and $10^8$ ohm cm., which is produced by partial carbonization of cellulosic or hemicellulosic material regenerated from an aqueous dispersion. A particular embodiment is a band clutch, the rotor of which has a surface covering of this semiconductive carbon, arranged to co-operate with steel bands.

---

This invention relates to electrostatic clutches of the kind employing the Johnsen-Rahbek effect, that is to say the effect of the production of an electrostatic attraction between a surface of an electrically conducting member and an adjacent surface of a semiconductive member under a voltage applied between the said members, which attraction causes adhesion between the said surfaces when the surfaces are initially in close juxtaposition. This effect, and its application in effecting engagement between two components of an electrostatic clutch, are described by A. D. Stuckes in an article entitled "Some Theoretical and Practical Considerations of the Johnsen-Rahbek Effect," published in the Proceedings of the Institution of Electrical Engineers, volume 103 (B), 1956, pages 125–131.

The invention is concerned, more particularly but not exclusively, with such electrostatic clutches which are of the type comprising a rotatable driving component and and one or more engageable components which are relatively stationary when not engaged with said rotatable component and are each in sliding contact with the driving surface of the rotatable component, and especially with such type of clutch in which the said surface of the rotatable component has the form of a surface of revolution (for example cylindrical) about the axis of rotation of the rotatable component and the or each engageable component consists of a band which extends across the said surface of the rotatable component with its length perpendicular to said axis, each said band being held in position, for example, by means of springs attached to each end. The rotatable component may consist of a core of electrically conducting material, usually steel, having, over the surface arranged to co-operate with the clutch bands, a covering layer of semiconductive material, the bands themselves being composed of metal, again usually steel. Alternatively the surfaces of the bands adjacent to the rotatable component may be covered with a layer of semiconductive material, the rotatable component being formed entirely of electrically conducting material or having an electrically conducting surface. In operation of the clutch, the rotatable component is rotated continuously, the normal friction between the surface of the said component and the band or bands being overcome by the bias of the springs; the application of a voltage between an electrically conducting part of the rotatable component and one of the bands co-operating therewith produces electrostatic attraction between the adjacent surfaces of the said component and band so that the force between them is increased, and if the attraction is sufficiently strong, depending upon the electrical resistivity and thickness of the semiconductive layer, the surfaces adhere together and the band is thus caused to move in the direction of rotation of the rotatable component, against the bias of the retaining springs, either until the increased spring tension overcomes the adehsive force or until the applied voltage, which may be of pulse form, ceases.

A clutch of this type is capable of very rapid operation, and is therefore advantageous for use in applying electrical signals to effect mechanical operations in devices in which a high operating speed is required, for example in card perforating machines.

The material employed for the construction of the semiconductive member of an electrostatic clutch, for example for a surface layer on the rotatable component of a clutch of the type referred to above, preferably possesses electrical resistivity in the range of $10^5$ to $10^8$ ohm cm., and should also be capable of accepting a high polish, should be resistant to wear by rubbing of the metal clutch bands or other co-operating component, and resistant to heat generated by friction and to atmospheric attack, and should possess dimensional stability. Materials which have been proposed for use for this purpose include some ceramic dielectric materials and dispersions of carbon in a rubber-base plastic matrix.

It is an object of the present invention to provide an improved form of electrostatic clutch wherein the semiconductive member is composed of an improved material which possesses the above-mentioned properties, in which the said properties can be substantially constant and readily reproducible, and which is easily manufactured, formed into a desired shape, and attached to a supporting member, for example, in a clutch of the type referred to above, to the core of a rotatable component or to the bands arranged to co-operate therewith.

According to the invention, in an electrostatic clutch of the kind depending for its operation upon the Johnsen-Rahbek effect, as hereinbefore defined, the material of which the said semiconductive member is formed consists of a polymeric organic substance which has been partially carbonised to form semiconductive carbon as hereinafter defined.

The term "partially carbonised" as used herein, with reference to the semiconductive material described, is to be understood to imply that the material contains sufficient carbon to render it semiconductive to a degree requisite for the satisfactory operation of an electrostatic clutch in the manner described above, but that the carbon content is not so high as to impart to the material an electrical conductivity approaching that of pure carbon. For practical convenience, the degree of semiconductivity of the material is determined by measuring the electrical resistivity thereof. Thus the semiconductive carbon employed in a clutch in accordance with the invention is a material of substantially homogeneous composition, consisting mainly of carbon, of a firmly compacted microporous texture, and having an electrical resistivity in the range of $10^3$ to $10^8$ ohm cm. Preferably the semiconductive carbon contains more than 80% by weight of carbon, and has an electrical resistivity in the range of $10^5$ to $10^8$ ohm cm.

The semiconductive carbon may be formed of a partially carbonised synthetic polymeric material, for example polymerised furfuryl alcohol. However, in a preferred form of the invention, the semiconductive carbon is composed of partially carbonised regenerated cellulosic or hemicellulosic material.

In the following description, reference will be made to the accompanying drawings, in which.

Figure 4:
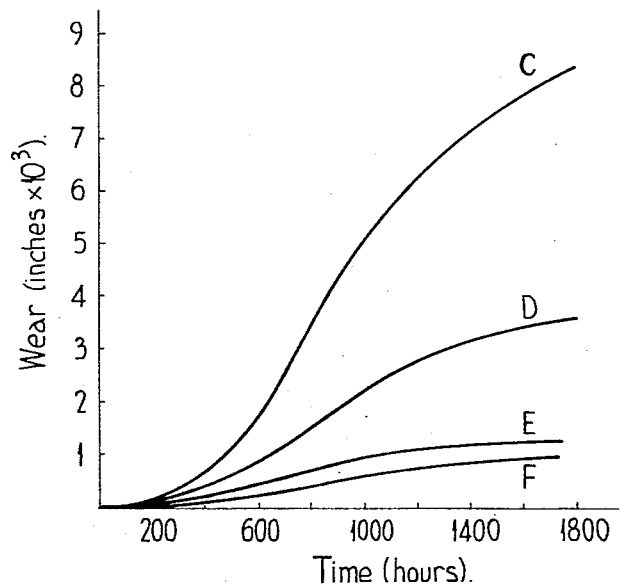
Figure 5:
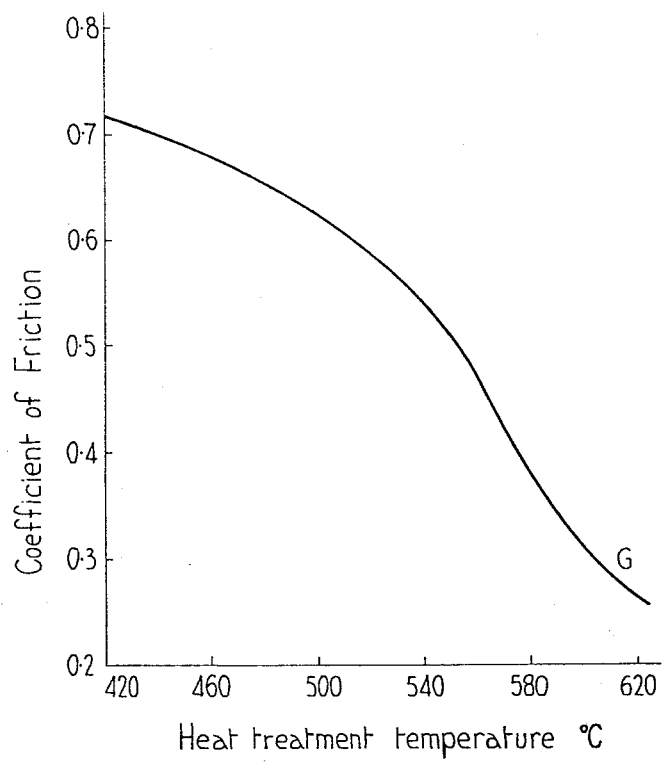

FIGURE 4 comprises a series of curves showing the rates of wear, under different loads, of a semiconductive carbon derived from regenerated hemicellulosic material; and FIGURE 5 is a curve showing the variation of the coefficient of friction of a semiconductive carbon, derived from regenerated hemicellulosic material, with variation in the heat treatment temperature employed in the production of the semiconductive carbon.

The partially carbonised cellulosic or hemicellulosic material can be prepared by methods similar to those described in United States Letters Patent No. 3,104,159 issued to Hugh Wilson Davidson Sept. 17, 1963, for Production of Graphite and assigned to the assignee of the present application. The basic process in accordance with the said patent consists essentially in forming a dispersion of fibrous cellulosic or hemicellulosic material in an aqueous medium, regenerating the cellulosic or hemicellulosic material by extracting the bulk of the water from the dispersion, and drying the regenerated material, which is subsequently carbonised by heat treatment, the early stages of the heat treatment preferably being carried out under pressure.

Figure 1:
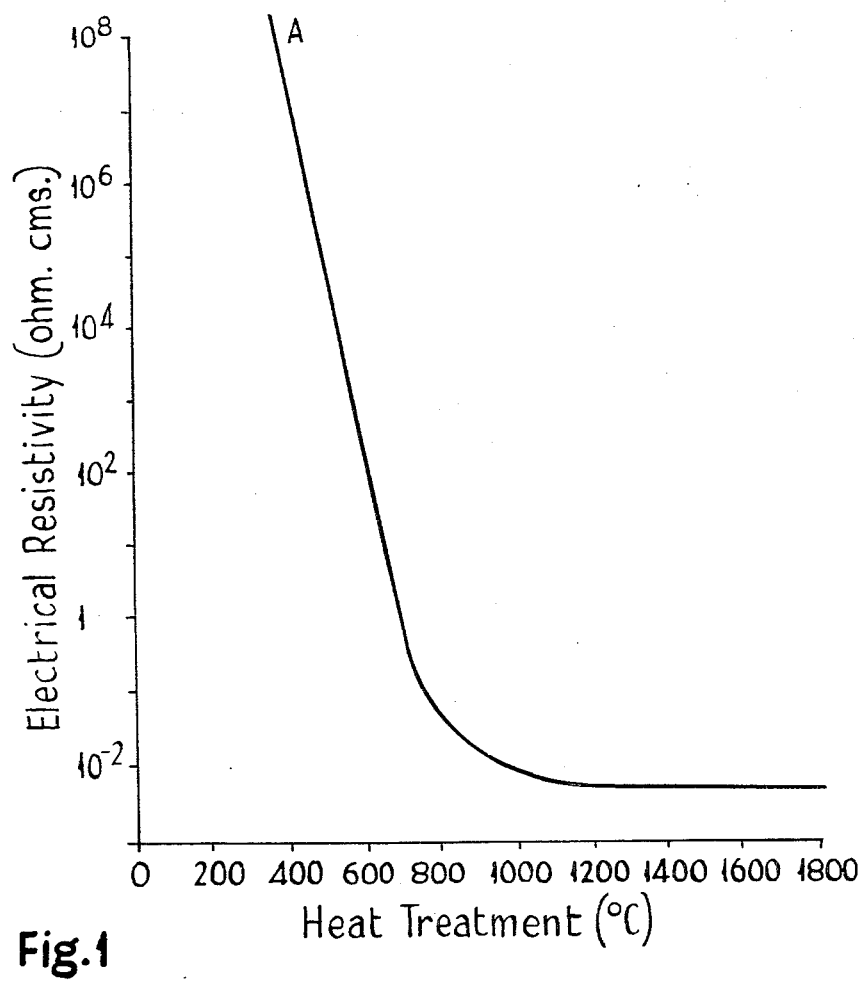
FIGURE 1 is a curve showing the effect of heat treatment temperature on the electrical resistivity of semiconductive carbon composed of partially carbonised regenerated cellulosic or hemicellulosic material.

We have now found that by heating the regenerated cellulosic or hemicellulosic material in such a manner that only partial carbonisation is achieved, a semiconductive material suitable for forming the semiconductive member of an electrostatic clutch is produced, and that by suitable adjustment of the heat treatment temperature a material of a desired degree of carbonisation, and hence having a desired value of electrical resistivity, can be obtained. The manner in which the electrical resistivity of regenerated cellulosic or hemicellulosic material which has been heated, varies with the heat treatment temperature employed is shown in FIGURE 1 of the accompanying drawings: the curve A in the drawing has been obtained by plotting heat treatment temperatures as abscissae against electrical resistivity as ordinates.

Thus the method of manufacturing a semi-conductive member for use in the construction of an electrostatic clutch in accordance with the preferred form of the invention includes the steps of forming an aqueous dispersion of a cellulosic or hemicellulosic material, at least partially regenerating the said material by removing the bulk of the water from the dispersion, forming the regenerated or partially regenerated material into a body of the desired shape of the member to be produced, drying the shaped body, and heating the dried body to a temperature in the range of 400° C. to 600° C. in an atmosphere which is substantially non-reactive with the cellulosic or hemicellulosic material under the conditions of treatment, to convert the body to semiconductive carbon. Preferably at least an initial stage of the heat treatment, up to a temperature of 400° C. to 450° C., is carried out under pressure, for example under an initial pressure (that is to say a pressure at room temperature) of 100 atmospheres. Preferably also the dried body is heated to a temperature in the range of 425° C. to 550° C., to impart to it an electrical resistivity within the range of $10^8$ to $10^5$ ohm cm., as indicated by the curve A of FIGURE 1 of the accompanying drawings.

The shaped body can be formed from the regenerated or partially regenerated cellulosic or hemicellulosic material by using known moulding techniques, but particularly advantageous methods of moulding such material and simultaneously extracting a high proportion of the residual water therefrom are described in the specification accompanying copending Patent application Ser. No. 242,505 by Howard Harold Walter Losty, filed Dec. 5, 1962, for Manufacture of Shaped Articles from Dispersions of Cellulosic and Like Materials, and assigned to the assignee of the present application. These methods comprise placing the material in a die of which the wall, or part of the wall, is permeable to the liquid medium, and either applying superatmospheric pressure to the material within the die or applying a reduced pressure to the exterior of the die.

One preferred form of electrostatic clutch in accordance with the invention comprises a rotatable driving component and one or more bands arranged to cooperate, in the manner referred to hereinbefore, with the driving surface of the rotatable component which surface has the form of a surface of revolution about the axis of rotation of the said component, wherein the said band or bands is or are formed of electrically conducting material, and the rotatable component consists of a rigid core provided, over the said surface or that part of the said surface with which the said band or bands is or are arranged to cooperate, with a covering layer of semiconductive carbon as aforesaid, the interior surface of said layer being arranged in contact with an electrically conducting surface, and for operation of the clutch electrical connections being arranged to be made to the said electrically conducting surface and to the said band or bands. Usually the core of the rotatable component is formed wholly of electrically conducting material, steel being a suitable material since, in addition to being electrically conducting, its mechanical properties, such as strength and inertia, render it suitable for forming the main bulk of the rotatable component of a clutch. However, if desired, the said core can be formed of a non-conducting material having suitable mechanical properties, a layer of electrically conducting material then being interposed between the core and the covering layer of semiconductive carbon.

The covering layer of semiconductive carbon, for the driving surface of the rotatable member of the form of clutch referred to in the preceding paragraph, which layer is preferably composed of partially carbonised regenerated cellulosic or hemicellulosic material, is usually required to be fabricated in the form of a tube. The regenerated cellulosic or hemicellulosic material may be cast in the form of a tube, for example by centrifuging the initial aqueous dispersion, as described in the aforesaid Patent No. 3,104,159. Another method of forming tubes of the regenerated material, which is described in the specification of co-pending patent application Ser. No. 242,505, comprises placing the aqueous dispersion, or a plastic pulp of partially regenerated material produced by removing some of the water from the initial dispersion by filtering or centrifuging, in a cylindrical die having a base permeable to liquid and provided with a central mandrel, and extracting water from the dispersion or pulp through the base of the die by evacuation.

In the specification accompanying co-pending patent application Ser. No. 432,107 by Howard Harold Walter Losty, filed Feb. 11, 1965, as a continuation-in-part of application Ser. No. 216,547, both now abandoned for Manufacture of Tubular Carbon Articles, and assigned to the assignee of the present application, an improvement in the above-described tube-making processes is described, which comprises carrying out at least a part of the heat treatment, during which shrinkage of the tube occurs, with a mandrel inserted within the tube, for controlling the internal configuration attained by the tube as it shrinks. This improvement can readily be applied to the manufacture of a rotatable component for a clutch in accordance with the invention.

Thus one method of manufacturing a rotatable driving component comprising a rigid core with a semiconductive layer substantially covering its driving surface, for an electrostatic clutch in accordance with the invention, includes the steps of forming an aqueous dispersion of a cellulosic or hemicellulosic material, regenerating the dispersed material in the form of a tube, drying the tube, heating the dried tube to a temperature in the range of 400° C. to 600° C. in an atmosphere which is non-reactive with the cellulosic or hemicellulosic material under the conditions of treatment, and allowing the semiconductive carbon tube thus produced to cool, at least one of the steps in the process of drying, heating, and cooling the tube being carried out with a rigid mandrel, of diameter smaller than the internal diameter of the tube, inserted within the tube for controlling the manner of shrinkage of the tube during the said step, and fitting the tube on to a rigid core. Preferably at least an initial stage of the heat treatment is carried out under pressure, as aforesaid, and the preferred heat treatment temperature is again in the range of 425° C. to 550° C.

If desired, the rigid core of the rotatable component can itself be conveniently employed as the mandrel on to which the regenerated cellulosic or hemicellulosic tube is shrunk during the heat treatment, or during the subsequent cooling, or for both of these steps. Thus in one method of manufacturing a rotatable component the dried tube is heated without a mandrel, and the rigid core is inserted within the tube subsequently to the heat treatment and prior to the cooling step, the diameter of the core being such that as a result of differential contraction of the core and the tube during cooling the tube, when cold, fits tightly to the surface of the core.

Alternatively, the heat treatment can be carried out with a suitable mandrel inserted within the tube to ensure that no distortion of the tube occurs as a result of shrinkage during the heating, this mandrel then being replaced by the core for the cooling step. In another alternative procedure, where the heating is carried out in two or more stages, the first stage may be carried out without a mandrel, and is preferably carried out under pressure, and a mandrel is inserted into the tube for the remaining stage or stages of the heat treatment, which may be carried out at atmospheric pressure. In another convenient procedure, for fitting the tube on to the core, the tube is allowed to cool, preferably on a mandrel which has been used during the final stage of the heat treatment, the mandrel is removed, the interior surface of the tube is then polished, and if necessary machined to conform to the surface of the core, and the tube is re-heated sufficiently to enable the core to be inserted therein, and is finally cooled on the core.

The material employed for the mandrel, or for the core if used as a mandrel, in the above-described method of manufacturing a rotatable component for an electrostatic clutch, must of course have thermal expansion characteristics such that when a tube of cellulosic or hemicellulosic material, which has been heated at an appropriate temperature within the range referred to above, is cooled on the core, the contraction of the core will be appreciably less than that of the tube. Regenerated cellulosic or hemicellulosic material which has been heated at these temperatures has a relatively high coefficient of expansion, as is apparent from the drawing accompanying the above-mentioned continuation-in-part application Ser. No. 432,107, now abandoned, which shows the variation of the expansion coefficient of hemicellulosic material with heat treatment temperature, as compared with the expansion coefficient of a steel having the composition, by weight of 18% chromium, 8% nickel, 2% manganese, minimum 0.2% silicon, maximum 0.15% carbon, titanium in a proportion equal to four times the carbon content, and balance iron. A steel of this type is a suitable material for the core of an electrostatic clutch rotor, and has a coefficient of expansion of $17.5 \times 10^{-6}$ cm./cm./° C., which is lower than that of regenerated cellulosic or hemicellulosic material which has been partially carbonised by heating at a temperature in the range of 400° C. to 570° C.

As indicated above, the relative dimensions of the partially carbonised tube and the core, and the heat treatment temperature, can be suitably adjusted so that the tube will be sufficiently tightly fitting to the core, as a result of shrinkage of the tube on to the core, to prevent any slipping between the tube and the core from taking place during operation of the clutch. However, the range of heat treatment temperatures which be used will produce partially carbonised tubes having coefficients of expansion varying over a wide range, so that a sufficiently tight fit might not always be achieved by shrinking the tube on to the core. Accordingly, to allow for such variations in expansion, and to increase the flexibility of the process, in some cases it may be desirable to fix the semiconductive carbon tube to the core by additional means, for example by soldering or by the use of an adhesive. We have found that an epoxy resin type of adhesive, such as the material sold under the trade name "Araldite," mixed with a plasticiser and applied as a thin coating on the interior surface of the tube, is suitable for this purpose. If an insulating adhesive of this kind is used, either the junction between the semiconductive carbon tube and the metal core is rendered electrically conducting by the incorporation of a dispersion of conducting particles, such as aluminum flake or powder, in the adhesive, or alternatively, and preferably, the inner surface of the tube is provided with a conducting layer, for example by applying a coating of silver paint, before the adhesive is applied thereto. In the latter case the electrical connection, for operation of the clutch, is made to the said conducting layer, and it is thus not necessary for the core to be formed of electrically conducting material; instead, the core may be formed of a non-conducting material having suitable mechanical properties as aforesaid, since it is merely required to function as a support for the semiconductive layer.

Usually the core of a rotatable driving component of a clutch will be of cylindrical form; but in some cases it might be of other shapes, for example of a stepped configuration, that is to say formed of a plurality of cylindrical members of different diameters placed end-to-end. In such cases it will be necessary to carry out the step of drying the tube of regenerated cellulosic or hemicellulosic material with a mandrel of the same shape as the core inserted within the tube. The relative dimensions of such a mandrel and the tube must of course be such that as a result of shrinkage on drying the tube will engage with the mandrel and attain the configuration thereof.

The partially carbonised tube, after completion of the heat treatment, and either before or after it is mounted on the rotor core, can be machined if necessary to reduce its thickness as required. In machining the outer surface of the tube, it is sometimes advantageous to machine strips instead of the whole surface, to form shallow grooves around the periphery of the tube, of substantially the same width as the bands arranged to co-operate with the rotor in operation of the clutch, so that the bands can be accurately located in these grooves and thus prevented from slipping along the surface of the rotor. This arrangement has the additional advantage that the thicker portions of the tube, between the grooves, impart additional strength thereto, thus reducing the risk of any distortion of the tube occurring in operation of the clutch. Alternatively it is possible to turn grooves in the tube of regenerated cellulosic or hemicellulosic material before it is dried, the increased surface area thus produced being advantageous for facilitating drying.

One specific method which we have employed for the manufacture of a cylindrical rotatable component with a semiconductive layer on the driving surface, for an electrostatic clutch in accordance with the invention, will now be described in the following specific example, and the construction of a clutch incorporating such a component will also be described with reference to FIGURE 2 of the accompanying drawings.

The starting material for the production of the covering layer of the clutch rotor, in the method of the example, was a dispersion of hemicellulosic material prepared by heating 450 grams of wheat straw pulp in 23 litres of water for 8 hours in a Weverk Valley Type beater: this dispersion contained approximately 2% by volume of solid material, and the solid content was increased to about 10% by volume by centrifuging. The resulting pulp, in a wet plastic state, was mixed with sufficient water to reduce the solid concentration to about 4%, and then kneaded into a die consisting of an aluminium cylinder of internal diameter 6 inches, with a porous graphite base, and fitted with a central mandrel of stainless steel of diameter 2.5 inches. The die was then enclosed in a vacuum-tight vessel, which was evacuated for 30 minutes, the pressure within the vessel being reduced to 4–5 cm. of mercury; during the evacuation the vessel was intermittently raised and lowered, so that the bottom of the vessel struck the base of the support structure with considerable force approximately once every two seconds. The bulk of the water was thus extracted from the pulp through the base of the die; after the pressure in the vessel was restored to atmospheric pressure, the tube was heated to 80° C. The product of this evacuation and heating process was a tube of dense regenerated hemicellulosic material 20 inches in length. This tube, with a steel mandrel inserted therein, was hung in an air oven and further dried at 70° C. for three days, at the end of which period it was hard and non-deformable and had shrunk to a length of 10 inches, with internal diameter 2.5 inches and external diameter 2.7 inches.

The dried hemicellulosic tube was placed in a pressure vessel which was filled with nitrogen under a pressure of 100 atmospheres, and the vessel was then heated up to 500° C. over a period of 96 hours and was maintained at this temperature for 8 hours, the pressure rising during the heating to about 360 atmospheres. The pressure was then gradually reduced at a rate not greater than 100 lbs. per square inch every quarter of an hour, to atmospheric pressure, and the vessel was allowed to cool. The partially carbonised tube thus produced was removed, its interior surface was polished, the tube was reheated to 200° C., a cylinder of steel, of the composition specified above, of length 10 inches and diameter 1.9 inches, was inserted within the tube, and the whole was allowed to cool to room temperature; the tube, whose final length was 7½ inches, had then contracted to fit tightly on to the steel cylinder, with a portion of the latter protruding at each end. The manufacture of the clutch rotor was completed by machining the outer surface of the tube to reduce the wall thickness of the tube from 0.075 inch to 0.050 inch.

Figure 2:
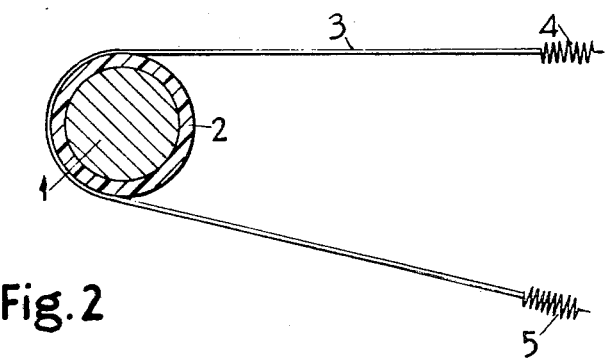
FIGURE 2 shows diagrammatically, in sectional elevation, the construction of a specific form of electrostatic clutch in accordance with the invention.

The rotor manufactured as described in the above example was used in the construction of the electrostatic clutch shown diagrammatically in sectional elevation in FIGURE 2 of the accompanying drawings.

Referring to FIGURE 2, 1 is the steel core of the clutch rotor and 2 is the semiconductive carbon covering layer of the rotor driving surface, formed as described above (the covering layer is shown with exaggerated thickness). A number of stainless steel bands each 0.002 inch thick and 0.060 inch wide, one of which is shown in the drawing (3), were held under tension by means of springs 4, 5, in sliding contact with approximately half of the circumference of that part of the rotor provided with the semi-conductive covering layer.

A clutch of this form is adapted for operation by direct current, electrical connections being made to the steel core of the rotor and to the steel bands (no connections are shown in the drawing). The clutch is suitable for use in a card perforating machine, operating components of the machine, not shown in the drawing, being attached to the clutch bands in known manner.

In operation of the clutch shown in the drawing the rotor was rotated at the rate of 300 r.p.m., so that slipping occurred between the rotor and the steel bands. On the application of 150 volts between the rotor core and any one of the bands, a radial attractive force between the rotor and the band was produced, due to electrostatic attraction between the band and the semiconductive carbon covering of the rotor: this attractive force resulted in a sufficient increase of frictional force to cause the band to adhere to the rotor and to move in the direction of rotation of the rotor. It was thus evident that the semiconducive properties of the surface layer of the rotor were such that the applied voltage was sufficient to cause the system to develop a thrust exceeding that required to overcome the bias of the springs retaining the band and to accelerate the component attached to the band: the electrical resistivity of the partially carbonised material of the tube produced by the method described in the example was $10^6$ ohm cm.

The method of manufacturing a clutch rotor described in the above example may be modified by carrying out the heat treatment of regenerated hemicellulosic tube in two or more stages, and by employing a mandrel for the later stage or stages. Thus in one preferred method of carrying out the heat treatment, the tube is first heated under pressure, for example under an initial pressure of 100 atmospheres, up to 420° C., and cooled to room temperature after gradual reduction of the pressure, then a mandrel of steel as aforesaid, of the same diameter as the rotor core, is inserted within the tube, which is finally heated under atmospheric pressure to the required maximum temperature, in the range of 500° C. to 600° C., depending upon the value of the electrical resistivity of the tube material which it is desired to attain, and is maintained at this temperature for one hour. The mandrel is subsequently removed, and the tube is mounted on the rotor core by one of the methods described above. Thus in another modification of the method described in the example, the tube may be coated internally with a layer of silver paint, and then mounted on the core by means of an adhesive, as hereinbefore described, instead of being reheated and shrunk on to the core.

The invention has been described herein mainly in connection with electrostatic clutches of the type comprising a rotatable driving component and one or more bands arranged to co-operate therewith, the description being particularly concerned with clutches of this type in which the driving surface of the rotor, which is a surface of revolution about the axis of rotation of the rotor, is provided with a covering layer of semiconductive carbon, and the bands are of electrically conducting material. However, in an alternative form of this type of clutch, which is also within the scope of the invention, the driving surface of the clutch rotor can be formed of electrically conducting material, and each of the bands arranged to co-operate with the longitudinal surface of the rotor can comprise a layer of semiconductive carbon carried by a backing layer, which may consist of steel or any other suitable material possessing sufficient strength to withstand the thrust produced when the semiconductive carbon surface adheres to the surface of the clutch rotor.

Furthermore the invention is applicable to other types of electrostatic clutches, for example clutches comprising co-operating discs or shoes. Thus, in a disc clutch, one of the co-operating discs may be formed of an electrically conducting material, such as steel, the other disc being formed of semiconductive carbon, with or without a backing layer of steel or other suitable high strength material. Such a semiconductive carbon disc can be produced by subjecting to heat treatment, in the manner described above, a disc of regenerated cellulosic or hemicellulosic material formed by one of the methods described in the specification of co-pending patent application No. 242,505.

The surface of the semiconductive carbon disc, which is remote from the surface arranged to co-operate with the electrically conducting disc, is coated with a layer of electrically conducting material, such as silver paint, and is then fixed to the backing layer of high strength material, if used, by means of a suitable adhesive. It will further be appreciated that a clutch arrangement may comprise a plurality of rotatable driving components, all mounted on a single driving shaft, clutch bands or other suitable components being arranged to co-operate with each such rotatable component.

The partially carbonised cellulosic or hemicellulosic material used for the semiconductive member of an electrostatic clutch in accordance with the preferred form of the invention is advantageous for this purpose, not only by virtue of the fact that it possesses electrical resistivity in a range of suitable values, but also on account of other suitable properties. Thus this semiconductive carbon material is capable of withstanding high electric fields, for example fields of the order of 3000 volts/cm., to which it may be subjected in the operation of an electrostatic clutch. The material is hard, can readily be machined to effect any required adjustment of dimensions, and can be polished to give a satisfactory surface finish; the surface contains asperities which are so small that they are not removed by polishing, but which are adequate, even after polishing, for enabling Johnsen-Rahbek attractive forces of sufficient magnitude to be obtained. The material also possesses satisfactory friction characteristics, its thermal conductivity is adequate for dissipating heat generated by friction in operation of the clutch, and it is resistant to wear and is not subject to atmospheric attack. Moreover the material is dimensionally stable, and is readily reproducible as regards dimensions, composition and properties, within tolerance limits.

Figure 3:
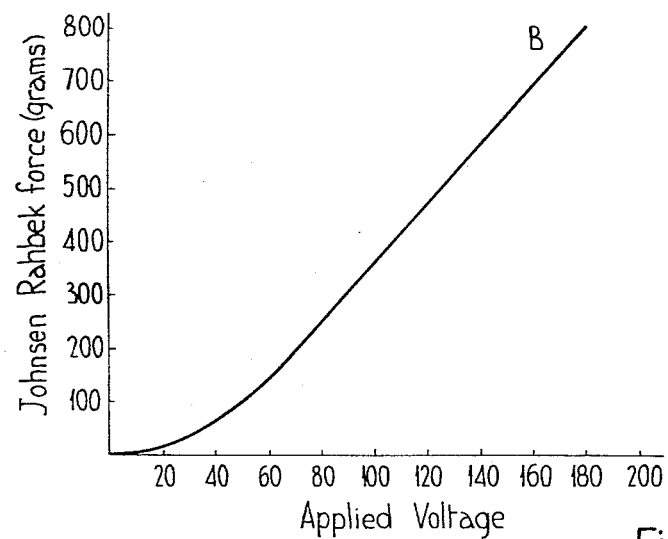
FIGURE 3 is a curve showing the variation of the Johnsen-Rahbek force produced with variation in the magnitude of the applied voltage, for a semiconductive carbon derived from regenerated hemicellulosic material.

Some of the properties of the semiconductive carbon material derived from cellulosic or hemicellulosic material, which are relevant to the performance of the material in an electrostatic clutch in accordance with the invention, are illustrated by the curves shown in FIGURES 3, 4, and 5 of the accompanying drawings.

The curve B of FIGURE 3 shows the manner in which the Johnsen-Rahbek force increases as the applied voltage between the clutch components increases, for one particular semiconductive carbon material which had been produced by heating a regenerated hemicellulosic tube at 540° C., and which was employed as the surface layer on a clutch rotor arranged to co-operate with steel bands. The curve was obtained by plotting applied voltages as abscissae against the Johnsen-Rahbek force, expressed in grams, as ordinates. A similar curve is obtained for semiconductive carbon materials which have been heat treated at temperatures in the range of 400° C., to 540° C.; however, with materials which have been heated at temperatures in the range of 540° C., to 600° C., the magnitude of the Johnsen-Rahbek force, produced by any given applied voltage, decreases with increasing heat treatment temperature.

FIGURE 4 shows the rate of wear, by stainless steel bands, of a semiconductive carbon tube produced by heating a regenerated hemicellulosic tube at 575° C., curves C, D, E and F showing the rates of wear produced with tensional loads of, respectively, 400 grams, 200 grams, 100 grams and 50 grams, applied to the steel bands. The tests were carried out by continuously rotating a clutch rotor, carrying a surface layer of the carbon material, while the steel band was held in sliding contact with a considerable portion of the rotor surface (as shown in FIGURE 2 of the drawings), one end of the band being fixed and the other end being free and carrying the appropriate weight (this being what is meant, above, by the tensional load). The rotor was rotated in the direction towards the loaded free end of the band, for a given length of time, and then the depth to which the surface of the carbon layer had been worn away was measured: the curves were obtained by plotting the time of running, in hours, as abscissae, against the amount of wear, in thousandths of an inch, as ordinates. We have found that a curve similar to curve C is obtained with a 400 gram load for semiconductive carbon materials produced at all heat treatment temperatures in the range of 400° C. to 575° C., but that with smaller loads the rate of wear tends to increase with decreasing heat treatment temperatures.

The manner in which the coefficient of friction of semiconductive carbon derived from regenerated hemicellulosic material varies with the maximum heat treatment temperatures employed in the production of the material is shown in FIGURE 5, the curve G having been obtained by plotting heat treatment temperatures as abscissae against coefficients of friction as ordinates. The coefficient of friction for each material was determined with the material forming the surface layer of a clutch motor, which was rotated so that the semiconductive carbon surface was in sliding contact with a steel band held in tension under a load of 60 grams, the arrangement of roto, band and load being similar to that described above with reference to the wear tests. Similar tests carried out under varying loads showed that the coefficient of friction, for a material which had been subjected to a given heat treatment temperature, decreased with increasing load. In general it is desirable for the operation of an electrostatic clutch that the semiconductive surface should possess a relatively high coefficient of friction, since this ensures that the maximum advantage is derived from the Johnsen-Rahbek effect: however the amount of heat generated also increases with increasing coefficient of friction, so that in practice these two effects must be balanced against one another when selecting the heat treatment temperature which will produce semiconductive carbon giving the optimum operating conditions. In this connection the thermal conductivity of the semiconductive material is important, and we have found that semiconductive carbon produced by heating regenerated cellulosic or hemicellulosic material at any temperature in the range of 400° C. to 600° C. is approximately $7 \times 10^{-3}$ calorie per centimetre per degree centigrade, which will ensure sufficiently rapid dissipation of the heat generated by friction in the operation of a clutch incorporating any of this range of carbon materials.

It has hitherto been found in practice that lubrication of the semiconductive surface of an electrostatic clutch is necessary, during operation of the clutch. It has previously been proposed to use either a liquid lubricant, such as a silicone oil or a fluorocarbon oil, or a solid lubricant, for example polytetrafluoroethylene or polyethylene, in the form of a block arranged to bear lightly on the semiconductive surface, for example the surface of a cylinder as it rotates. We have found, however, that the partially carbonised cellulosic or hemicellulosic material employed for the semiconductive member of a clutch according to the preferred form of the invention usually provides a satisfactory degree of self lubrication, thus rendering the use of an additional lubricant unnecessary for normal operation. If desired, however, for example if the clutch is to be operated in vacuum, particles of a solid lubricant can be incorporated in the semiconductive carbon by mixing the powdered lubricant with the initial regenerated cellulosic or hemicellulosic pulp before the latter is dried. Lubricants suitable for incorporation in this way include, for example, solid silicone lubricants, polytetrafluoroethylene talc, and molybdenum disulphide. The proportion of solid lubricant employed is usually about 10% by weight of the weight of pulp, although proportions up to 30% by weight can be used, at least in the case of talc, without producing any deleterious effect on the properties of the semiconductive carbon.

Moreover solid lubricants incorporated in the material in this way may also serve as fillers for modifying the degree of shrinkage occurring during the heat treatment.

Alternatively the surface layers of the semiconductive carbon in its final form can be impregnated with a suitable lubricant.

We claim:

1. An electrostatic clutch of the kind depending for its operation upon the production of an electrostatic attraction, between an electrically conducting surface of a first component and an adjacent semiconductive surface of a second component co-operating therewith, when a voltage is applied between the said components, the said attraction being of sufficient magnitude to cause adhesion between the said surfaces for effecting engagement between the said components, wherein the material of which the semiconductive part of said second component is formed consists of semiconductive carbon, being a member of the group consisting of cellulosic and hemicellulosic materials, regenerated from an aqueous dispersion of said material in a comminuted state and partially carbonized to form semiconductive carbon containing more than 80% by weight of carbon and having an electrical resistivity in the range of $10^3$ to $10^8$ ohm centimetres.

2. An electrostatic clutch according to claim 1, wherein the said semiconductive carbon has an electrical resistivity in the range of $10^5$ to $10^8$ ohm centimetres.

3. An electrostatic clutch which comprises: a rotatable driving component the driving surface of which has the form of a surface of revolution about the axis of rotation of said component and which consists of a rigid core provided, over at least part of the driving surface, with a covering layer of semiconductive carbon composed of a partially carbonised material which is a member of the group consisting of cellulosic and hemicellulosic materials and which has been regenerated from an aqueous dispersion of said material in a comminuted state, said semiconductive carbon containing more than 80% by weight of carbon and having an electrical resistivity in the range of $10^3$ to $10^8$ ohm centimetres, the said layer of semiconductive carbon being arranged in contact with an electrically conducting surface within the rotatable driving component; at least one band formed of electrically conducting material and arranged so as to extend across, in sliding contact with, the semiconductive carbon layer on the driving surface of said rotatable driving component, the length of each said band lying in a direction perpendicular to the axis of rotation of the rotatable driving component; and means for making electrical connections to each said band and to the said electrically conducting surface within the rotatable driving components to enable a voltage to be applied between the band and said surface for producing an electrostatic attraction between said band and the semiconductive carbon layer so as to effect engagement between the band and the rotatable driving component.

4. An electrostatic clutch according to claim 3, wherein the said semiconductive carbon layer has an electrical resistivity in the range of $10^5$ to $10^8$ ohm centimeters.

5. An electrostatic clutch according to claim 3, wherein the rigid core of the rotatable driving component is formed wholly of electrically conducting material.

6. An electrostatic clutch according to claim 3, wherein the rigid core of the rotatable driving component is formed of non-conducting material, and a layer of electrically conducting material is interposed between said non-conducting core and the surface layer of semiconductive carbon.

References Cited

UNITED STATES PATENTS

| 2,568,824 | 9/1951 | Rahbek | 192—21.5 |
| 2,897,425 | 7/1959 | Waring | 92—21.5 |
| 2,923,390 | 2/1960 | Fitch | 192—21.5 X |

FOREIGN PATENTS 994,676 6/1965 Great Britain.

FRED C. MATTERN, Jr., *Primary Examiner.*

DAVID J. WILLIAMOWSKY, *Examiner.*

C. J. HUSAR, *Assistant Examiner.*